July 23, 1968 J. DADOK 3,394,288
CIRCUIT ARRANGEMENT OF A SUPERSTABILIZER OF A MAGNETIC FIELD
Filed May 17, 1965
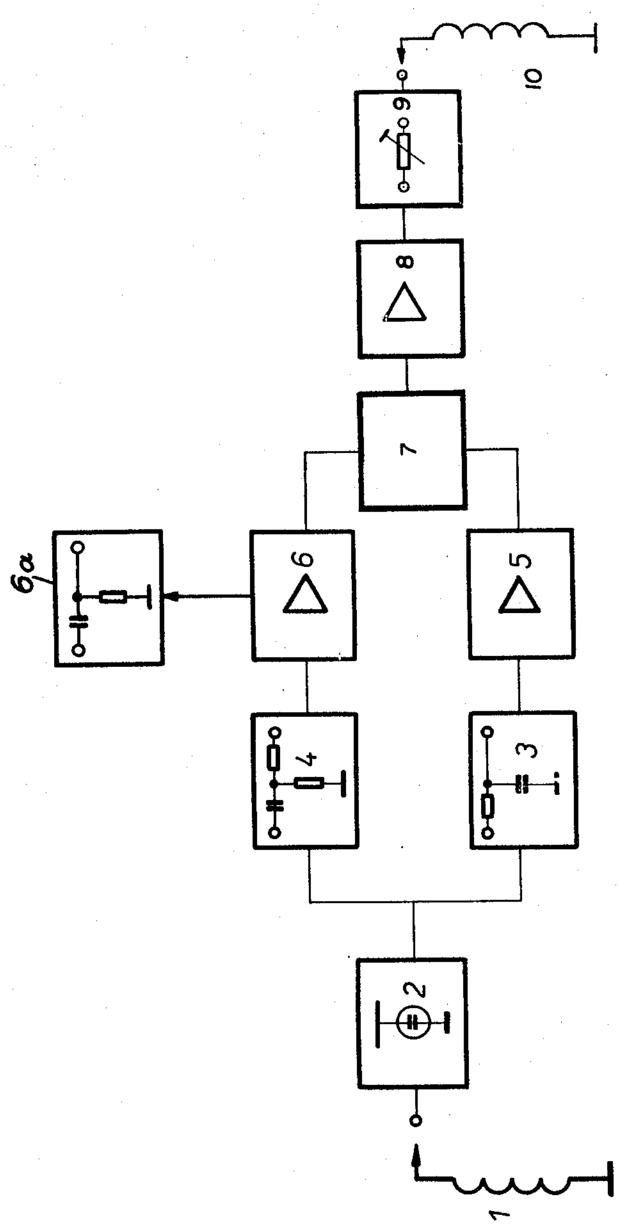
INVENTOR.
Josef Dadok
BY Richard Low
Ag't

United States Patent Office 3,394,288
Patented July 23, 1968

3,394,288

CIRCUIT ARRANGEMENT OF A SUPER-STABILIZER OF A MAGNETIC FIELD

Josef Dadok, Brno, Czechoslovakia, assignor to Ceskoslovenská Akademie Věd, Prague, Czechoslovakia Filed May 17, 1965, Ser. No. 456,386
Claims priority, application Czechoslovakia, May 18, 1964, 2,861/64
3 Claims. (Cl. 317—123)

ABSTRACT OF THE DISCLOSURE

In a superstabilizer of a magnetic field in the gap between the poles of a magnet, there are provided a pick-up coil which is connected in parallel with a glow-discharge tube protection device with two branches between said device and a superposing circuit. One of the branches comprises a low-pass filter and a D.C. amplifier, while the other branch is formed by a high-pass filter with an alternating current amplifier. Both branches are applied to said superposing circuit which is further connected with an output amplifier and still further, through a correction resistor, with a compensation coil.

This invention relates to a circuit arrangement of a superstabilizer of a magnetic field in the gap between the poles of a magnet, for example, in a spectroscope for nuclear magnetic resonance.

The magnetic field in the gap of a magnet should be highly stable to secure a high resolving power and accuracy. To this end, a so-called superstabilizer is used which is designed so that over the pole pieces of the magnet a coil system with a large number of turns is placed. The change in the magnetic field in the gap induces a voltage in the coils. This voltage is amplified in a D.C. amplifier and then integrated and supplied to a second system of coils also placed over the pole pieces in such a manner that the current flowing through these coils excites a field of opposite direction than the one produced by the original changes. The various components of the interference changes are thus weakened in accordance with the frequency dependence of the amplification in the loop. The D.C. amplifier must meet high requirements as to input sensitivity and zero stability. For this purpose, there has hitherto been used a galvanometric amplifier with a photoelectric bridge which secures the required parameters.

But the use of a galvanometric amplifier is attended with certain disadvantages. The input impedance of such an amplifier is rather low so that, for optimum matching, the pick-up coil must also have a relatively low impedance. However, for a given space of the pick-up coil, this means a lower number of turns, a lower induced voltage, and a higher relative effect of the thermoelectric potentials in the input circuit. It is also difficult to widen the frequency characteristic of the superstabilizer above a frequency of 100 c./s. which also determines the amplification in the loop at lower frequencies with regard to stability conditions.

Another drawback of the galvanometric amplifier is its sensitiveness to mechanical shocks which cause a shift in the zero point, and a low overloading capacity. If the magnet is suddenly switched off, the galvanometer may even be destroyed by a high transient voltage peak.

It is a general object of the present invention to eliminate the referred to drawbacks of known superstabilizers.

A more specific object of the invention is to widen the limit or cut-off frequency of such apparatus to above 500 c./s.

Another object of my invention is to improve zero stability as compared with galvanometric amplifiers.

Still another object of the invention is to eliminate the need of a shockproof construction.

Stated briefly, the circuit arrangement of a superstabilizer of a magnetic field in the gap of a magnet, for example, in a spectroscope for nuclear magnetic resonance, in accordance with the invention, provides that the pick-up coil is connected in parallel with a glow-discharge tube protection device with two branches one of which is formed by a low-pass filter and a D.C. amplifier, with the second branch being formed by a high-pass filter with an alternating current amplifier. Both branch signal frequencies are applied to an adding or superposing circuit which is further connected with an output amplifier, and, through a correction resistor, with a compensation coil.

The invention will be best understood from the following description to be read in conjunction with the accompanying drawing. The single figure of this drawing shows a block diagram of a preferred embodiment of my present invention.

Referring now in greater detail to the illustration, it should be understood that 1 denotes a pick-up coil, 2 is a glow-discharge tube protection device, 3 is a low-pass filter, 4 is a high-pass filter, 5 is a D.C. amplifier such as, for example, a well-known chopper amplifier or a contact-modulated amplifier, 6 is an alternating current amplifier, 7 is a superposing circuit, 8 is an output stage, 9 is a correction resistance, and 10 is a compensation coil.

The superstabilizer of the invention operates as follows:

The changes in the field in the magnet gap induce a voltage in the pick-up coil 1. After passing through the glow-discharge tube over voltage protection device 2, this voltage is divided into a D.C. component and into an alternating current component. Both signal components are treated and adjusted in the filters 3 and 4, amplified in the D.C. amplifier 5, and in the alternating current amplifier 6, and then added together in the superposing circuit 7. Finally, they are amplified in the output amplifier 8 and passed through the correction resistor 9 to the compensation coil 10. In this case, the impedance of the pick-up coil can be high because, by using a transformer in the input of the D.C. amplifier 5, its optimum value can be matched within wide limits.

The effect of thermoelectric potentials may thus be relatively suppressed. The glow-discharge tube 2 does not introduce under normal conditions any instability into the input circuit, and limits, together with the input filters, even high over-voltage peaks to an admissible value. The current flowing through the glow-discharge tube 2 is limited by the impedance of the coil 1, and the voltage pulse does not exceed the value of the operating voltage of the glow-discharge tube. The input of the D.C. amplifier 5 is protected by the low-pass filter 3 which integrates the remaining voltage peak. The alternating current amplifier input is protected by the series resistor of the high-pass filter 4 which limits the grid current in the case of a positive pulse polarity. The low-pass filter 3 is also provided to prevent the mains frequency voltage from penetrating into the D.C. amplifier. Both filters 3 and 4 and the amplifiers 5 and 6 are designed as a unit so that the resulting frequency characteristic, together with the output amplifier, has the required shape. The upper cut-off frequency is mainly determined by the properties of the coil and may readily be placed above 500 c./s.

In a practical embodiment of the principles of the present invention, the frequency $f_k$ at which the two branches 3, 5 and 4, 6 have the same amplification lies usually in the region in which the main source of noise is the flicker effect of the tubes. In order to reduce the noise voltage originating from the alternating current amplifier 6 in the region below the frequency $f_k$, it is convenient to place into the circuit of the amplifier 6 at least one differentiating member 6a at any point after the main source of noise voltage. The amplifier 6 is a multistage one. Thus, the differentiating member 6a may be placed as a coupling element between stages of the amplifier 6, after the stage representing the main source of noise. Alternatively, the member 6a may be placed at the output of the amplifier 6.

It is to be understood that the above described arrangements are only illustrative of the application of the principles of the present invention. Numerous other arrangements may be devised by those skilled in the art without departing from the spirit and scope of the invention.

I claim:

1. In a circuit arrangement of a superstabilizer of a magnetic field in the gap of a magnet,
- a pick-up coil,
- a glow-discharge tube protection device in parallel with said pick-up coil,
- a superposing circuit,
- two parallel branches between said glow-discharge tube protection device and said superposing circuit, one of said two branches comprising a low-pass filter and a D.C. amplifier, the second of said two parallel branches comprising a high-pass filter and an alternating current amplifier,
- an output amplifier in series with said superposing circuit,
- a correction resistor in series with the said output amplifier, and
- a compensation coil in series with the said correction resistor.

2. In the circuit arrangement as claimed in claim 1, at least one differentiating member in the circuit of said alternating current amplifier at any place after the main source of noise voltage.

3. In combination, means responsive to a change in magnetic field in the gap between the poles of a magnet structure for generating a voltage proportional thereto, a protection device connected to said generating means, an adding circuit, two parallel circuit paths interconnecting said device and said adding circuit, one circuit path including the series arrangement of a high-pass filter and an alternating current amplifier, the other circuit path including the series arrangement of a low-pass filter and a direct current amplifier, means for compensating for a change in magnetic field in said gap, and a series arrangement of a correction resistor and an output amplifier interconnecting said compensating means and said adding circuit.

References Cited

UNITED STATES PATENTS

| | | | |
|---|---|---|---|
| 2,979,641 | 4/1961 | Gunthard et al. | 317—123 |
| 3,039,045 | 6/1962 | Bell | 324—.5 |
| 3,080,507 | 3/1963 | Wickerham et al. | 317—123 |
| 3,103,623 | 9/1963 | Greenwood | 324—.5 |
| 3,137,813 | 6/1964 | Kroon et al. | 324—.5 |
| 3,179,878 | 4/1965 | Schwede | 324—.5 |
| 3,191,118 | 6/1965 | Jung et al. | 324—.5 |
| 3,239,752 | 3/1966 | Greenwood | 324—.5 |
| 3,257,608 | 6/1966 | Bell et al. | 324—.5 |
| 3,287,629 | 11/1966 | Varian | 324—.5 |

LEE T. HIX, *Primary Examiner.*

R. V. LUPO, *Assistant Examiner.*